3,234,285
BIS(CYCLOALKYLPHENOLS)

Rodney D. Moss, David A. Gordon, and John M. Corbett, Midland, Mich., assignors to The Dow Chemical Company, Midland, Mich., a corporation of Delaware
No Drawing. Filed May 17, 1962, Ser. No. 195,391
3 Claims. (Cl. 260—591)

This invention is concerned with bis(cycloalkylphenols), to polymeric compositions stabilized therewith, and to processes for making these compounds and compositions. More particularly, it is concerned with thermoplastic compositions comprising polymerized α-olefins stabilized against oxidative degradation with bis(cycloalkylphenols) having the structure

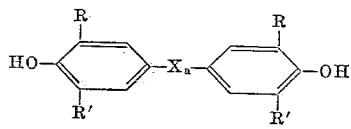

wherein R is cycloalkyl of 4–8 carbon atoms, R' is hydrogen, lower alkyl of 1–4 carbon atoms, or cycloalkyl of 4–8 carbon atoms, $n$ is zero or one, and X is oxygen, sulfur, or carbonyl. It is also concerned with new compounds represented by the above structure when $n$ is one.

These compounds may be prepared by a number of known methods for making compounds of this general nature. A particularly satisfactory synthesis of the compounds described above comprises the alkylation of a suitable diphenol by reacting it with about 2.0–2.5 molar proportions of a cycloalkene in the presence of a catalytic quantity of an acidic alkylation catalyst such as aluminum chloride, ferric chloride, or an acid activated clay such as Retrol, this preferably in the presence of a small amount of sulfuric acid. The reaction is carried out at about 150–250° C., usually under the autogenous pressure of the system. Cycloalkenes such as cyclobutene, cyclopentene, cyclohexene, cycloheptene, cyclooctene, and alkyl derivatives of these may be reacted in this way with diphenols such as p,p'-biphenol, p,p'-oxydiphenol, p,p'-thiodiphenol, 4,4'-dihydroxybenzophenone, and alkyl or cycloalkyl substituted derivatives of these having at least one reactive unsubstituted position on each benzene ring ortho to the hydroxyl group.

The bis(cycloalkylphenol) products obtained from this reaction are colorless or nearly colorless high-boiling liquids of extremely high viscosity which are crystallizable with difficulty. They are more or less soluble in the common organic solvents and insoluble in water. They possess bactericidal and fungicidal properties and so are useful component of anti-microbial compositions. They are also useful as intermediates in the preparation of polyesters and they may be reacted with olefin oxides such as ethylene oxide and propylene oxide to make polyethers of various molecular weights. They have been found to possess particular and unexpectedly high utility as stabilizers when incorporated into essentially linear polymers of α-olefins such as ethylene and propylene. The relatively high thermal stability of these bisphenols makes them unusually effective in this application. Particularly preferred for this use are the bisphenols where R' is hydrogen. These compounds show generally higher stabilizing efficiencies and have the economic advantage of being easier and cheaper to prepare than those having additional substituents.

The following examples illustrate various aspects of the invention.

EXAMPLE 1

*4,4'-oxybis(2-cyclohexylphenol)*

A mixture of 60.4 g. of p,p'-oxydiphenol, 53.3 g. of freshly distilled cyclohexene, 2.0 g. of Retrol acid activated clay, and one drop of concentrated sulfuric acid was loaded into a bomb and heated under autogenous pressure at 170–180° C. for 15 hours. The viscous reaction mixture was filtered and distilled through a short Vigreux column under high vacuum to yield 52.5 g. of 4,4'-oxybis(2-cyclohexylphenol) as a clear, colorless and very viscous liquid, B.P. 230–238° C./0.1–0.15 mm. The structure of the product was confirmed by infrared examination. Elemental analysis showed: carbon, 78.23% and hydrogen, 7.90%. The calculated values are carbon, 78.6% and hydrogen, 8.19%.

EXAMPLE 2

*4,4'thiobis(2-cyclohexylphenol)*

To a solution of 486 g. of o-cyclohexylphenol in 500 ml. of ethylene dichloride there was added 134 g. of sulfur dichloride over a period of 2 hours at 10–20° C. The reaction mixture was then heated gradually to 80° C. in 7 hours and the temperature was held at 80–85° C. for 2 hours. About 92% of the theoretical HCl had been evolved at this time. The reaction mixture was then cooled to room temperature, filtered, and distilled under high vacuum through a short Vigreux column. The product was a clear, nearly colorless, viscous liquid, B.P. 228–245° C./0.2 mm. It amounted to 69 g., a yield of 14% of the theoretical. Its identity as 4,4'-thiobis(2-cyclohexylphenol) was verified by infrared examination and elemental analysis. Found 8.42% S, calculated 8.38% S.

The above compound can also be made by reacting a mole of p,p'-thiodiphenol with about 2.0–2.5 moles of cyclohexene in the presence of an acid alkylation catalyst such as used in Example 1. The reaction is carried out substantially as described in Example 1 and the yield of product obtained is similar to that shown for the oxybisphenol.

EXAMPLE 3

*3,3'-dicyclohexyl-4,4'-dihydroxybenzophenone*

A mixture of 107.1 g. of 4,4'-dihydroxybenzophenone, 98.4 g. of freshly distilled cyclohexene, 2 g. of Retrol, and two drops of concentrated sulfuric acid was heated in a sealed bomb at 275–285° C. for 15 hours. After the bomb had been cooled and opened, the viscous reaction mixture was removed, filtered, and distilled under high vacuum. The distilled product was a viscous light straw colored liquid, weight 41 g., B.P. 200–223° C./0.1–0.2 mm. This material crystallized on long standing to a light yellow solid melting at about 30° C. The structure of the product as 3,3'-dicyclohexyl-4,4'-dihydroxybenzophenone was verified by infrared examination. Elemental analysis showed: carbon, 78.53% and hydrogen, 7.76%. Calculated: carbon, 79.3% and hydrogen, 7.93%.

By procedures similar to those shown above, there are prepared other biphenols, oxybisphenols, thiobisphenols, and carbonylbisphenols of the same general structure and having at least one cycloalkyl group ortho to each hydroxyl group in the molecule. Representative compounds are 4,4'-oxybis(2-cyclopentylphenol), 4,4'-oxybis(6-cyclohexyl-o-cresol), 4,4'-oxybis(2,6-dicyclohexylphenol), 4,4'-oxybis(2-cyclooctylphenol), 4,4'-thiobis(2-cyclobutylphenol), 4,4'-thiobis(2-cyclopentylphenol), 4,4' - thiobis(6 - cyclohexyl - o - cresol), 4,4' - thiobis(2-cycloheptylphenol), 4,4' - thiobis(2 - (4 - methylcyclohexyl)phenol), 3,3' - dicyclopentyl - 4,4' - dihydroxybenzophenone, 3,3' - dibutyl - 5,5' - dicyclohexyl - 4,4' - dihydroxybenzophenone, and 3,3' - dicyclooctyl - 4,4 - dihydroxybenzophenone.

Normally solid polymers of α-olefins, for example, polyethylene, polypropylene, polybutene, polybutadiene, poly- (4-methyl-1-pentene), polystyrene, and mixed polymers such as ethylene-propylene copolymers including physical mixtures of polyolefins as well as polymers obtained by the copolymerization of mixed monomers and other such mixtures are protected against degradative oxidation to a surprisingly high degree by incorporation in them of relatively small amounts of these bis(cycloalkylphenols). These compounds are also effective stabilizers in hydrocarbon fractions such as gasoline, Diesel fuel, lubricating oils, and similar products to protect these materials from oxidative degradation.

As stabilizers in polyolefins, the compounds of this invention are employed in proportions of about 0.001% to about 1.0% by weight of the composition, depending upon the particular polymer and the degree of stability required. In most cases, 0.01% to about 0.5% is preferred. These stabilizers exhibit their protective effect most strikingly and are therefore preferably used in combination with a similar quantity, that is, about 0.02% to about 1.0% by weight of an auxiliary antioxidant known to promote the stabilizing efficiency of phenolic compounds. Suitable auxiliary antioxidants include in particular higher alkyl diesters of thiodialkanoic acids, for example, the dilauryl and distearyl esters of 3,3'-thiodipropionic acid whose mixtures with phenolic antioxidants show synergistic stabilizing efficiencies.

In a representative procedure, a bisphenol stabilizer is compounded with a polyolefin and the composition is tested as shown below.

An essentially linear, crystalline polypropylene was employed for testing. About 300 g. of granular polypropylene having a melt index of about 3 is stirred in an open container with about 200 ml. of a methylene chloride solution of the additive or additives to be tested. Stirring is continued until nearly all the methylene chloride has evaporated and the additive has been thoroughly dispersed. The treated polypropylene is dried at 60° C. under nitrogen in a vacuum oven for about 4 hours. The additive or mixture of additives is then further mixed with the polymer by extrusion at about 250° C. The extruded plastic, after being converted into pellet form for handling, is then compression-molded at about 230° C. into 100 mil thick samples. These test pieces are exposed in a circulating air oven at 150° C. and are examined periodically until the first signs of degradation are noted. This oxidative degradation shows up as the formation of spots of powdery disintegration of the solid structure and is usually associated with a slight darkening of the polymer. The time in hours to reach this point is referred to as the "oven-life" and where two values are given in the following table under this heading for a particular composition, these are respectively the time of the last observation when the sample appeared unchanged and the time of the next observation when signs of degradation were first apparent.

Some representative test results using these new compounds as stabilizers are shown in Table I and results obtained with known bisphenol stabilizers are included for comparison. In each case shown, 0.05% by weight of the bisphenol and 0.25% by weight of dilauryl 3,3'-thiodipropionate (DLTDP) was incorporated into the polymer sample.

TABLE I

| Additive: | Oven-life, hrs. |
|---|---|
| None | Less than 4 |
| 4,4'-oxybis(2-cyclohexylphenol) +DLTDP | 1460–1520 |
| 4,4'-thiobis(2-cyclohexylphenol) +DLTDP | 1300–1380 |
| 2,2'-dicyclohexyl-4,4'-biphenol +DLTDP | 1600–1720 |
| 4,4'-methylenebis(2-cyclohexylphenol) +DLTDP | 880–900 |
| Polybutylated bisphenol A+DLTDP | 650–710 |

In addition to the above, a sample of polypropylene containing 0.05% of 3,3' - dicyclohexyl - 4,4' - dihydroxybenzophenone and 0.25% DLTDP was found to be effectively stabilized. By way of comparison, samples of polypropylene containing about 0.1% by weight of any of the bisphenols alone had oven-lives of about 50–80 hours while samples containing about 0.5% of DLTDP as the sole stabilizer showed oven-lives of less than 500 hours.

Homologous 4,4' - oxybis(2 - cycloalkylphenols), 4,4'-thiobis(2-cycloalkylphenols), 2,2'-dicycloalkyl-4,4'-biphenols, 3,3'-dicycloalkyl - 4,4'-dihydroxybenzophenones, and their alkyl and cycloalkyl substituted derivatives are similarly found to stabilize polyolefins and hydrocarbon fractions effectively against oxidative degradation. Other thermoplastic compositions are also stabilized against such deterioration by these compounds.

We claim:
1. A compound having the structure

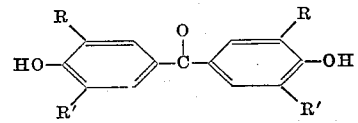

wherein R is cycloalkyl of 4–8 carbon atoms, R' is selected from the group consisting of hydrogen, lower alkyl, and cycloalkyl of 4–8 carbon atoms.

2. 3,3' - dicycloalkyl - 4,4' - dihydroxybenzophenone, wherein cycloalkyl is of 4–8 carbon atoms.

3. 3,3'-dicyclohexyl-4,4'-dihydroxybenzophenone.

References Cited by the Examiner

UNITED STATES PATENTS

| 2,955,038 | 10/1960 | Smith | 260—613 |
| 2,976,324 | 3/1961 | Long | 260—609 |
| 3,006,959 | 10/1961 | Armitage et al. | 260—591 |
| 3,050,500 | 8/1962 | Sherwood | 260—45.95 |
| 3,068,151 | 12/1962 | Hoefele | 167—87.1 |
| 3,069,384 | 12/1962 | Coffield | 260—45.95 |
| 3,083,234 | 3/1963 | Sax | 260—613 |

LEON ZITVER, *Primary Examiner.*

LEON J. BERCOVITZ, DANIEL D. HORWITZ, *Examiners.*